United States Patent [19]

Miller

[11] 4,333,010
[45] Jun. 1, 1982

[54] DOSE CALIBRATOR LINEARITY EVALUATION

[76] Inventor: William H. Miller, 4245 Wooster Rd., Fairview Park, Ohio 44126

[21] Appl. No.: 261,748

[22] Filed: May 8, 1981

[51] Int. Cl.³ ............................................. G01D 18/00
[52] U.S. Cl. ..................................... 250/252; 250/505
[58] Field of Search ................... 250/252, 361 R, 362, 250/363 R, 369, 374, 375, 388, 393, 505; 128/659

[56] References Cited

U.S. PATENT DOCUMENTS

| | | |
|---|---|---|
| 3,524,063 | 8/1970 | Mangan .......................... 250/252 X |
| 3,598,109 | 8/1971 | Yokohamashi . |
| 3,657,541 | 4/1972 | Deutsch et al. ...................... 250/252 |
| 3,690,309 | 9/1972 | Planknokoy et al. . |
| 3,883,738 | 5/1975 | Glover et al. . |
| 3,935,449 | 1/1976 | Reunanen . |
| 3,950,643 | 4/1976 | Charlton . |
| 4,158,135 | 6/1979 | Thorell . |
| 4,198,986 | 4/1980 | Suzuki . |

Primary Examiner—Davis L. Willis
Attorney, Agent, or Firm—Watts, Hoffmann, Fisher and Heinke

[57] ABSTRACT

A method and apparatus is disclosed for evaluating the linearity of response of a radioactivity dose measurement device over a range of radioactivity dose levels. In accordance with the method, a reference dose of radiopharmaceutical in a container is placed in a central, substantially non-absorptive tube mounted atop a cylindrical spacer with a lead slug coaxial in the tube and positioned below the spacer. This assembly is placed in a measurement chamber of the measurement device, and the response of the device to the unshielded radioactivity is recorded. A succession of leaded shielding sleeves, each having a different known radioactivity attenuation capability, is placed, one at a time, over the central tube. A measurement reading of the device is recorded for indicating the response of the measurement device to the reference dose as shielded by each different sleeve. Multiplication of each response reading by a correction factor, which is a function of the attenuation capability of the sleeve used in obtaining the reading, yields data from which linearity of measurement device response can be easily calculated.

11 Claims, 11 Drawing Figures

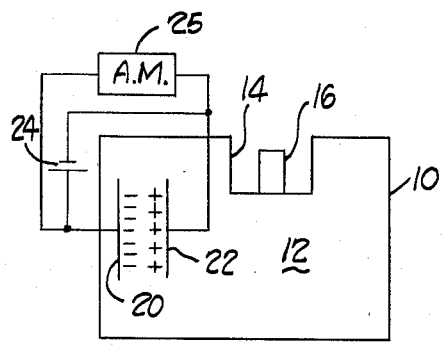
Fig. 1
(PRIOR ART)
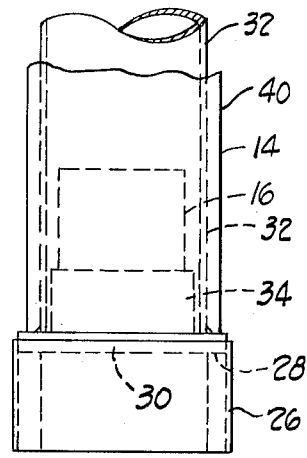
Fig. 2
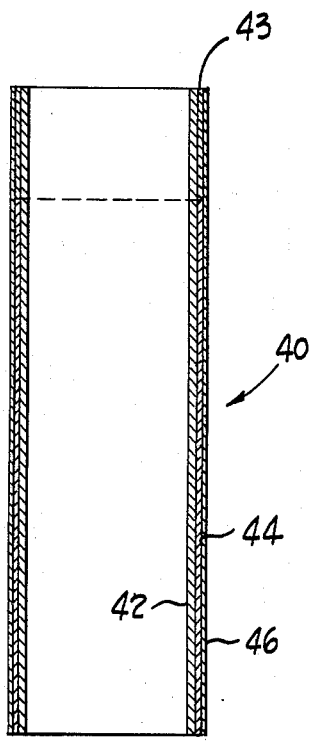
Fig. 3
| SLEEVE NO. | NO. OF 4 MIL Pb WRAPS | ATTENUATION (APPROX. %) |
|---|---|---|
| 1 | 0 | 0 |
| 2 | 2 | 41 |
| 3 | 4 | 65 |
| 4 | 8 | 88 |
| 5 | 12 | 95.7 |
| 6 | 16 | 98.5 |
| 7 | 20 | 99.5 |
Fig. 4

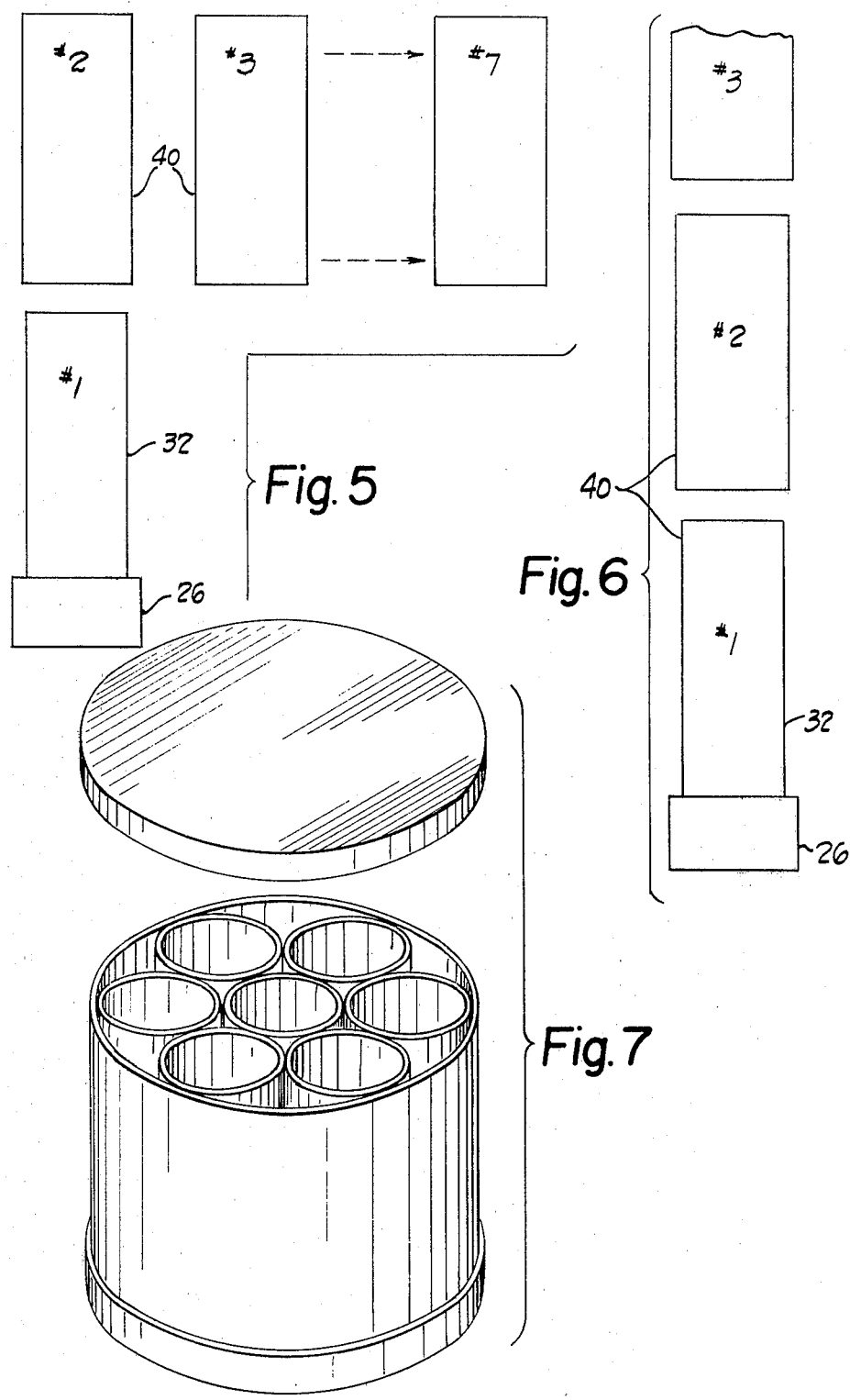

DOSE CALIBRATOR LINEARITY EVALUATION

DESCRIPTION

1. Technical Field

This invention relates generally to the field of nuclear medicine. More specifically, the invention pertains to apparatus and method for evaluating the linearity of radioactivity response of a device used for measurement of the radioactivity of radiopharmaceutical doses for administration to patients. Such devices are known as "dose calibrators".

One type of dose calibrator includes a gas-tight envelope defining an interior volume containing an ionizable gas. The envelope walls also define an externally recessed, generally cylindrical measurement chamber into which, in use, a quantity of radiopharmaceutical material, whose radioactivity is to be measured, is placed. The radiopharmaceutical may be either a quantity drawn from an on-the-scene generator of radioactive material, which is then placed in a vial for measurement, or a prepackaged portion of radiopharmaceutical contained in a syringe or the like, which is purchased in its packaged form from a commercial supplier, or radiopharmacy.

Also within the envelope is a pair of plates constituting electrodes. The electrodes are externally coupled to a source of dc electrical potential of approximately 250 volts. An ammeter measures any current between electrodes.

When a radioactive material is placed in the measurement chamber, the emergent radioactive energy enters the envelope and ionizes the gas inside to a degree which is a function of the amount of radioactivity present. The positive and negative ions thus generated migrate to the negative and positive electrodes, respectively, and cause a current to flow. The amount of current registered on the ammeter is thus a function of the amount of radioactivity present in the measurement chamber.

An example of a known type of dose calibrator is the "Radioisotope Calibrator", manufactured and sold by Capintec, Inc. of Montvale, N.J., U.S.A.

Ideally, a dose calibrator should have a substantially linear current response over a wide range of radioactivity of measured doses. Government regulations, including both Federal and some state regulations, require periodic verification by the operator of each dose calibrator in the field that the dose calibrator is operating within a prescribed approximation of linearity. Usually, such regulations call for this type of verification on at least a quarterly basis. To pass such a linearity test, each dose calibrator tested must exhibit a response which is within ±5% of perfect linearity, over a wide range of activity levels, or in some cases between ±10%. If the dose calibrator exhibits less perfect linearity than established by these standards, it may not be used until it has been serviced to correct its inaccuracies to within the prescribed standard, and that performance has been verified by subsequent testing. See, for example, Nuclear Regulatory Commission (NRC) Regulatory Guide 10.8 Appendix D, Section 2E, which is hereby expressly incorporated by reference.

2. Background Art

Two methods of evaluating the linearity of a dose calibrator are chiefly used in order to acquire a set of readings of dose calibrator response over a wide range of radioactivity levels. One method, called "fractionation", involves placing different amounts of radiopharmaceutical in the dose calibrator in relatively rapid succession. The other involves placing a fixed reference dose in the dose calibrator and taking a succession of readings with the instrument as the reference dose decays to lower activity levels. While both of these methods are effective in accurately testing the activity linearity of a dose calibrator, each has disadvantages. The former requires unnecessary exposure to radiation and considerable skill. The latter is time-consuming, inconvenient and expensive.

In the fractionation technique, the operator first inserts into the measurement chamber a vial containing a relatively large quantity of radioactive material. A radioactivity reading of this sample is then taken with the dose calibrator. The operator then removes the vial from the measurement chamber, removes part of the radioactive material from the vial, and returns the vial to the chamber containing the new smaller volume of radioactive substance. A second reading is then taken. By successively removing fractions of the volume of the radioactive material from the vial, and taking readings at each new volume, it is possible to derive a graph of the dose calibrator's response to varying degrees of radiation, and to then evaluate its linearity.

The fractionation technique, however, requires the operator or technician to handle the radioactive material several times during the course of acquiring a single set of measurement readings. This is disadvantageous, since it is always preferable to minimize radioactivity exposure of those who handle such materials. Moreover, proper execution of the fractionation technique requires repeated precise measurements of the quantity of radiopharmaceutical present in the vial to assure an accurate set of readings.

The decay method requires somewhat less operator exposure than does the fractionation technique, but requires a much longer time for acquiring a set of readings, and is an expensive technique. The decay method, in order to acquire a sufficient number of readings to satisfy regulations, requires at least 48 hours to perform. An operator places a reference dose of radiopharmaceutical in the dose calibrator, and takes the first reading. Subsequent readings, for most widely used radiopharmaceutical material, must be taken frequently during the testing period. During this time, the reference dose must be repeatedly removed from and replaced in the dose calibrator to perform each measurement.

It is obvious that the performance of the decay method of linearity evaluation requires temporary removal of the dose calibrator from the inventory of the nuclear medicine facility each time a measurement is performed. It is also inconvenient and expensive in that it requires periodic operator intervention in order to acquire the required readings. This also results in multiple exposure of the operator in taking the periodic readings.

Additionally, the performance of the decay test procedure consumes the reference dose. The dose, in order to perform a valid test sequence, must be allowed to decay to practically a zero level of radiation. After such decay, it is not useful as a radiopharmaceutical, and must be discarded. Since typical doses of radiopharmaceutical presently cost between $30 and $100, the loss of such material constitutes significant waste. The problem is exacerbated by the fact that the test must be repeated, in most instances, at least four times a year.

It is an object of this invention to provide an apparatus and method for evaluating the linearity of response of a dose calibrator quickly, easily and economically, requiring a minimum of operator time and exposure.

DISCLOSURE OF THE INVENTION

The present invention substantially overcomes the disadvantages of the prior linearity evaluation techniques. The invention provides a method for evaluating a response of an apparatus for measuring the amount of radiation produced by a source which is subject to decay. The method includes the steps of disposing the source for measurement by the measuring apparatus, and for rapidly simulating different amounts of source decay by successively shielding the source to different degrees. For each degree of shielding, the response of the measurement apparatus is determined, and linearity is evaluated by a comparison of these readings.

This method exceeds the speed of even the fractionation method, and combines this advantage with the decay method's elimination of the need for repeated handling and measuring of radioactive material. In accordance with this invention, an entire series of readings, sufficient for evaluation in accordance with the regulations, can be obtained in as little as 3½ minutes. The operator need not repeatedly handle the reference dose. The prior need for precisely measuring dose fractions is eliminated. There is no need to interrupt availability of the dose calibrator for routine use. The operator is not required to take readings at spaced intervals over several days, as was the case with the decay method. Finally, the evaluation technique as taught by this invention is performed so quickly that the radiopharmaceutical material used to constitute the reference dose need not be wasted. Rather, it can be subsequently administered to a patient or used in other ways, since its radioactivity does not appreciably decay during the test. The speed and ease with which this test can be performed in accordance with this invention is likely to encourage users of dose calibrators to evaluate dose calibrator linearity more frequently than required by the regulations, thus fostering improved accuracy of these measuring instruments.

In accordance with another aspect of this invention, apparatus is provided for evaluating performance of a device for accommodating and measuring a source of radiation. Such apparatus comprises a set of similarly configured shielding elements, each adapted for shielding the source when in place in the measuring device. The shielding elements have different shielding capabilities, for attenuating by different amounts radiation emergent from the source.

According to a more specific feature of the invention, each of the shielding elements comprises a leaded shielding sleeve or tube which is adapted for substantially surrounding the source when placed in operative relationship to the measuring device.

Such shielding sleeves are made of a laminate construction, one layer of which comprises at least one wrap of lead foil.

By varying the number of layers of lead foil wrap applied among the several shielding sleeves, each can be provided with a different degree of radioactivity absorbing capability.

In accordance with the method taught here, as used in connection with such shielding sleeves, a user sequentially places each sleeve over the source, and takes a measurement reading indicating the measuring instrument's response to the varying degrees of attenuation of the source radioactivity.

In accordance with a more specific aspect of apparatus embodying this invention, there is also provided structure for supporting the reference dose in the measurement chamber of a dose calibrator, and for facilitating use of the set of shielding sleeves. In accordance with this aspect, a generally cylindrical pedestal, suitable for fitting within the measuring chamber, is provided. The top end of the pedestal is covered by a highly absorptive shield comprising preferably a lead slug. Atop the lead slug is affixed a substantially nonabsorptive central tube disposed substantially coaxially with the pedestal element. A spacer element of nonabsorptive material rests atop the lead slug within the bottom portion of the central tube. The reference dose, in a vial or syringe, is then placed within the central tube so that it is seated on top of the spacer.

This structure combines to form a convenient assembly for accommodating and enclosing the reference dose within a confined region, and for supporting the reference dose at a generally predictable and repeatable geometry with respect to the dimensions of the measurement chamber.

The central tube is sized to accommodate the sliding placement thereover of each of the shielding sleeves, facilitating rapid successive placement of each sleeve in position about the source.

A more specific feature of the invention comprises color and/or alphanumeric coding of each of the shielding sleeves, so that a user can quickly and easily determine which sleeve he is using, and consequently which level of absorption is being employed, in taking the particular reading.

An alternative embodiment of the invention comprises the construction of the sleeves such that their respective inside and outside diameters facilitate telescopic placement of more than one sleeve about the source at any given time. Such a construction makes feasible standardizing the manufacture of each sleeve with a substantially identical amount of radiation shielding.

Another aspect of the method of this invention comprises pretesting of each shielding sleeve element to determine its individual radiation attenuating capability. The method further comprises taking successive readings with a dose calibrator having a reference dose placed in the measurement chamber by successively shielding the source with each of the shielding elements, and taking one reading for each degree of shielding. Then each reading is multiplied by a factor which is a function of the radiation attenuating capability of the shielding element utilized in obtaining that measurement. Comparison of these products facilitates rapid determination of the degree of linearity of the apparatus, particularly where the correction factor is the inverse of the fraction of radioactivity not absorbed by the corresponding shielding element.

DESCRIPTION OF THE DRAWINGS

FIG. 1 is a schematic drawing of a prior art apparatus suitable for use with this invention;

FIG. 2 is an elevational view of a portion of an embodiment of this invention;

FIG. 3 is an elevational view in cross-section of another portion of an embodiment of this invention;

FIG. 4 is a tabular illustration of particular details of the present invention;

FIG. 5 is an elevational view illustrating a relation between portions of the invention of FIGS. 2 and 3;

FIG. 6 is an elevational view showing an alternate relation between portions shown in FIGS. 2 and 3;

FIG. 7 is a perspective view of means for packing and storing an embodiment of the present invention.

BEST MODE FOR CARRYING OUT THE INVENTION

Figure 8:
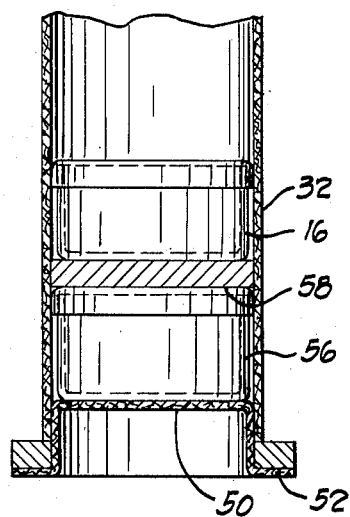
FIG. 8 is an elevational view of an alternate embodiment of a portion of the invention of FIG. 2.

FIG. 1 shows in simplified form a radiopharmaceutical dose calibrator for measuring the amount of radioactivity present in a radiopharmaceutical dose. The linearity of calibrator's response to the amount of radioactivity in the dose is evaluated by the method and apparatus of this invention. The dose calibrator includes an envelope 10 defining both an interior volume 12 and a generally cylindrical external recessed measurement chamber 14 for accommodating a vial 16 containing a dose of radiopharmaceutical material whose activity is to be measured. The volume 12 contains a gas which is susceptible of ionization in response to the impingement of radioactivity.

A pair of electrodes 20, 22 within the volume 12 are coupled to a source 24 of dc electrical potential. The source applies a dc voltage of approximately 250 volts between the electrodes 20, 22. An ammeter 25 measures any current between the electrodes.

When the vial 16 (or a prepackaged container) containing radioactive material is placed in the recessed measurement chamber 14, radioactive energy from the radiopharmaceutical material penetrates into the volume 12 and ionizes the gas to a degree which is a function of the amount of radioactivity present in the material. The ions thus generated migrate to the electrodes having opposite polarity. This migration causes a current flow in the electrical circuit which the ammeter senses.

The current is thus a function of the amount of radioactivity present in the chamber 14. Notation and recording of the current thus provides an indication of the size of the radiopharmaceutical dose present in the measurement chamber.

It is desirable that the amount of current change be a linear function with respect to the amount of radioactivity present in the chamber 14. The present invention facilitates the testing or evaluation of the degree of such linearity exhibited by the dose calibrator.

FIG. 2 shows a portion of an embodiment of this invention constituting assembly for holding the radiopharmaceutical dose in the measurement chamber of the dose calibrator. This assembly includes a pedestal element 26 preferably comprising a cylinder made from heavy cardboard or other mechanically suited material. The cylinder is approximately 1 inch in height and has an outside diameter of approximately 1.939 inches.

The upper end of the pedestal wall is routed out to form an interior shoulder portion 28 which is suitable for snugly accommodating therein a lead slug 30. The slug is disc shaped, with a diameter of approximately 1.875 inches and a thickness of approximately 0.25 inches.

Atop the slug 30 is a central tube 32. The central tube preferably comprises a cardboard cylinder approximately 10.5 inches in length and having inside and outside diameters of 1.375 and 1.475 inches, respectively. A suitable adhesive holds the central tube 32 securely to the lead slug, coaxially aligned with the pedestal 26.

The exterior of the central tube 32 is preferably covered with a color coded cosmetic wrap (not shown) comprising colored paper or suitable plastic. The exterior of the central tube 32 can suitably be sprayed or otherwise covered with an appropriate substance such as lacquer, for enhancing appearance and/or abrasion resistance.

A cylindrical spacer element 34 is provided for insertion into the bottom region of the central tube 32. The spacer preferably comprises a thick disc made of a material substantially transparent to radioactivity such as styrofoam or the like. The spacer functions as a support base for the vial 16 containing the radiopharmaceutical dose which is inserted into the central tube for measurement by the dose calibrator. Preferably, the spacer 34 is about 2 inches thick, and fitted snugly in the central tube.

A preferred embodiment of the assembly shown in FIG. 2 provides for holding the vial 16 in a confined and repeatable geometry with respect to the dimensions of the measuring chamber 14. In such a preferred embodiment, the outside diameter of the pedestal 26 is sized to be only slightly less than the inside diameter of the cylindrical measurement chamber defined by the walls 14. Such a sizing provides for a snug fit of the pedestal into the measurement chamber and assures substantially the same positioning of the central assembly with respect to the measurement chamber each time it is inserted therein.

Similarly, the inside diameter of the central tube 32 is preferably sized to be only slightly greater than the outside diameter of the vial 16. This arrangement provides a means whereby, each time the assembly containing the vial 16 is inserted into the measurement chamber, the location of the radioactive dose is substantially identical with respect to the measurement chamber.

FIG. 3 illustrates in cross-section a leaded shielding sleeve or tube 40 adapted to slidably fit over the central tube 32 to shield, to a partial degree, the radioactive dose in the vial 16. Preferably, the apparatus of this invention comprises six such shielding tubes, but since each is similarly constructed, only one is illustrated in FIG. 3.

Each shielding tube 40 is made of a laminate construction. For purposes of clarity, the thicknesses of the various layers in the walls of the shielding tubes are exagerated in FIG. 3.

The core layer of each shielding tube 40 comprises a cardboard cylinder 42 having a length of approximately 10.5 inches and an inside diameter of approximately 1.5 inches. A collar 43, approximately ½ inch in length, surrounds one end of the cardboard tube 42. The remainder of the cardboard tube is covered with at least one wrap 44 of lead foil approximately 0.004 inches thick and suitably fixed by adhesive to the outside of the cardboard tube. As described below, each shielding tube has a different number of lead wrap layers.

A cosmetic wrap, similar to that of the central tube 32 and indicated by reference character 46, is disposed over the outer surface of the lead foil wrap. As in the case of the central tube 32, each shielding tube 40 is uniquely color coded. Additionally, alphanumeric coding is preferably added to the exterior of the central tube and each shielding tube 40 in known fashion, and as illustrated for example in FIG. 5.

FIG. 4 is a tabular illustration detailing the number of layers of 4-mil lead foil applied to each of the different shielding tubes. In FIG. 4, tube number 1 corresponds to the central tube 32 having no lead wrap applied. The right hand column of FIG. 4 illustrates the approximate amount of radiation attentuation effected by the correspondingly identified numbers of lead foil wraps, as determined by testing.

FIG. 5 illustrates a method of use of the embodiment of this invention. There is shown generally the central tube 32 and pedestal 26. Within the central tube 32 (not shown) is located the vial 16 containing a reference dose of radioactivity. The amount of radioactivity in the reference dose is chosen to approximate the largest dose the calibrator is designed to measure. In use, the assembly comprising central tube 32 and pedestal 26 is lowered into the measuring chamber 14 of the dose calibrator, with the vial inside. The operator then takes a reading of the unshielded radioactivity within the central tube 32. He then successively slides shielding tubes 2-7 over the central tube 32, and takes a reading of the sensed radioactivity with each tube in place. The readings are recorded.

To evaluate the results, each radiation reading is multiplied by a correction factor which is a function of the amount of shielding provided by the tube used in obtaining that reading. More specifically, the correction factor is the inverse of the fraction of radiation which the particular shielding tube does *not* absorb. For example, referring to FIG. 4, the correction factor for sleeve number 2 would be the inverse of 0.59. The other correction factors are determined in like fashion.

If the dose calibrator's response is perfectly linear, the tabulated products, obtained as described above, should be equal. To the extent that they are unequal, an operator can see at a glance, and easily calculate, the degree of non-linearity, for comparison with the applicable standard.

The apparatus of this invention is useful in evaluating linearity even without knowledge of the exact amount of attentuation effected by each shielding tube. A method for employing the embodiment without benefit of this knowledge is as follows: a dose calibrator is tested by one of the prior art methods to verify that it is initially sufficiently linear in response. The response of the dose calibrator is then evaluated by the use of this invention, and the response readings corresponding to the use of each shielding sleeve are recorded. If at some later time, one wishes to compare the subsequent degree of linearity of the dose calibrator with its previous degree of linearity, he need only repeat the process utilizing the embodiment of this invention, and compare the later obtained readings with those obtained earlier.

FIG. 6 illustrates an alternate embodiment of this invention. FIG. 6 illustrates the central tube 32 and pedestal 26 in general form. In the embodiment of FIG. 6, the inside and outside diameters of the shielding sleeves are sized such that the sleeves can be accommodated in a telescopic relationship over the central tube 32. In this way, multiple sleeves can be placed about the central tube 32 simultaneously.

This embodiment enables a degree of standardization of sleeve construction. Specifically, the lead foil wrap layer of each sleeve can be identical in the embodiment of FIG. 6. This is true because the shielding of the sleeves can be cumulative, as more telescoping sleeves are added about central tube 32.

FIG. 7 shows a storage container for the embodiment of this invention. The container comprises a relatively heavy canister made of cardboard or some other suitably rigid material. The canister is approximately 11.5 inches high and has an inside diameter of approximately 5.5 inches. A cap, approximately 3.5 inches tall, is provided for covering the canister. The canister is sized such that the central tube and pedestal assembly, when placed in the center, snugly accommodates the planatary disposition of the six shielding tubes about the central assembly. In this way, a convenient and compact storage configuration is achieved.

While tests have shown that the embodiments described above perform satisfactorily, further preliminary testing has indicated that another embodiment may be preferable.

According to this embodiment, as shown in FIG. 8, the pedestal 26 is replaced by a plastic plug 50 having a flange 52. The plug is inserted into the bottom end of the central tube 32, with a lead annulus 54 interposed between the central tube bottom and the flange 52. A cylindrical spacer 56, made of cardboard or plastic, is inserted into the central tube and rests upon the plug 50. A lead disc 58 rests atop the spacer 56. The vial 16 is then placed above the lead disc, with a second spacer 57 interposed therebetween.

This embodiment of the central assembly is used with the leaded sleeves in the same manner as described above, in connection with the previously described central assembly. The modified central assembly minimizes leakage of unshielded radiation from the vial into the dose calibrator.

Figure 9:
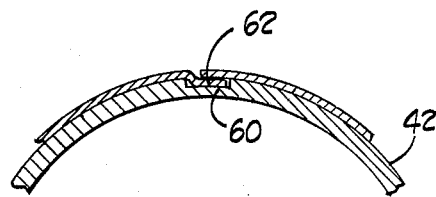
FIG. 9 is a detailed drawing showing an alternate embodiment of a portion of the invention shown in FIG. 3.

The walls of the central tube, and the core layer 42 of the shielding tubes are preferably made of plastic for greater durability. Moreover, the core of each shielding sleeve bears a longitudinal notch 60, 16 mils deep, for accommodating the initial edge 62 of the lead foil wrap. This configuration (see FIG. 9) reduces any undulation in the lead wrap surface which the initially attached foil edge may have caused.

Figure 10:
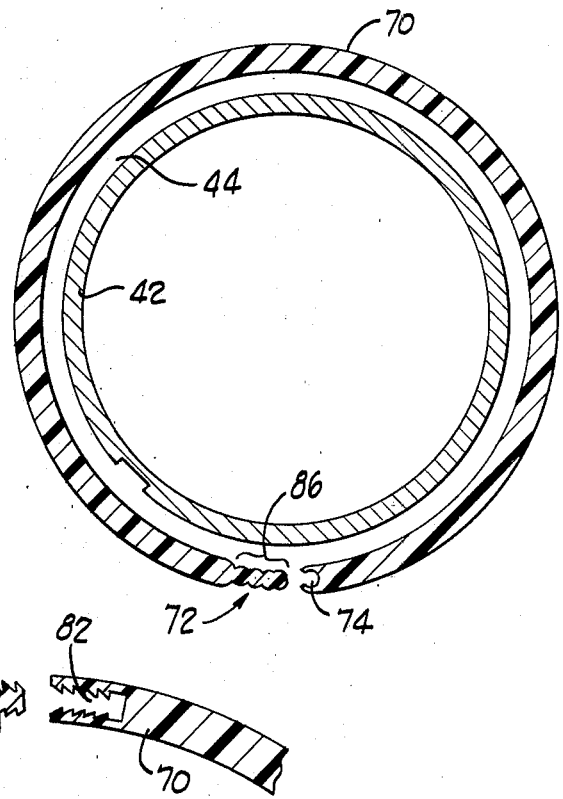
FIG. 10 is a drawing of a further alternate embodiment of a portion of the invention shown in FIG. 3
Figure 11:
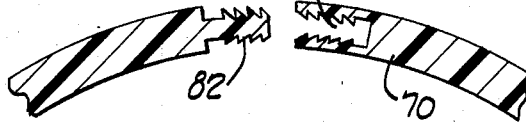
FIG. 11 is a detailed drawing of an alternate embodiment of a portion of the invention shown in FIG. 10.

The outer layer of each shielding sleeve can comprise, instead of a paper wrap 46, a flexible plastic jacket 70. At its meeting edges, the jacket defines a tongue and groove type of closure structure 72, 74 (FIG. 10). The closure structure can, for example, comprise a cylindrical appendage or protrusion which can be snap fitted into a cylindrical socket on the opposite edge, or a toothed tongue member 80 (FIG. 11) insertable into a mating toothed keeper recess 82.

In manufacture, the jacket's circumference can be adjusted to correspond to that of the amount of lead wrap applied to each individual shielding sleeve. With the embodiment of FIG. 10, a series 86 of protrusions can be provided, and an appropriate number of the appendages can be snipped off before assembly to insure a snug fit of the jacket around the lead wrap. Thus, a standardized jacket fits all the sleeves.

Also particular to this embodiment, the collar is omitted from the shielding sleeves, and the lead wrap extends over the full length of the sleeve.

It is to be understood that this disclosure of the present invention is intended as illustrative, rather than exhaustive, of the invention. Certain additions, deletions and/or modifications can be made to the specific embodiments described here without departing from the spirit of the invention or its scope, as defined by the appended claims.

I claim:

1. A test method for evaluating response of a dose calibrator for measuring the amount of radiation produced by a radioactive source subject to decay, said method comprising the steps of:
   (a) disposing the source for continuous measurement by the dose calibrator during the test;
   (b) simulating different amounts of source decay by successively differingly and incompletely shielding the source during a single test;
   (c) monitoring the response of the dose calibrator to the shielded source at each of the differing shieldings, and
   (d) comparing said monitored responses.

2. Apparatus for evaluating the linearity of a radiopharmaceutical dose calibrator, said apparatus comprising:
   (a) an assembly comprising:
      (i) a tubular pedestal element;
      (ii) a radioabsorbtive slug affixed for substantially covering a top end of the pedestal;
      (iii) a substantially non-radioabsorptive central tube affixed substantially atop the slug covering the pedestal end and being substantially coaxial with and having a diameter smaller than that of said pedestal, for accommodating insertion into said central tube of a reference dose of radiopharmaceutical, and
   (b) a plurality of radiation shielding sleeves each slidable over the central tube, each shielding sleeve having a differing and incomplete degree of radioactivity absorbing effect.

3. The apparatus of claim 2, further comprising: each sleeve having a laminate construction one layer of which being a wrap of lead foil.

4. The apparatus of claim 2, wherein the sleeves bear color coding indicating their respective radioactivity absorbing effect.

5. The apparatus of claim 2 or 4, wherein the sleeves each bear respectively unique alphanumeric indicia.

6. The apparatus of claim 2, further comprising: a spacer interposed within the central tube substantially atop the absorptive slug.

7. A test process of evaluating uniformity over time of response linearity of a radioisotope dose calibrator, said process comprising the steps of:
   (a) testing the dose calibrator to assure that its degree of linearity of response is initially within a predetermined standard;
   (b) placing a quantity of isotope in the dose calibrator for measurement;
   (c) shielding the radioisotope in a succession of different and incomplete degrees during a single test procedure:
   (d) measuring and recording the response of the dose calibrator during each of said successive shielding steps;
   (e) later repeating steps (c) and (d), and
   (f) comparing the two steps of measurements derived from the performance of steps (d) and (e).

8. A test method for evaluating the response linearity of a radiopharmaceutical dose calibrator, said method comprising the steps of:
   (a) placing a referenced dose in the calibrator;
   (b) successively shielding the reference dose to different known and incomplete degrees during a single test procedure;
   (c) recording a calibrator measurement reading for each degree of shielding;
   (d) multiplying each reading by a factor which is a function of the degree of shielding corresponding to that reading, and
   (e) comparing the resulting products.

9. Apparatus for testing linearity of a dose calibrator comprising:
   (a) a central assembly comprising:
      (i) a central tube;
      (ii) a flanged plug in the bottom end of the tube;
      (iii) a lead annulus interposed between the flange and the tube and encircling the plug;
      (iv) a spacer in the central tube atop the plug,
      (v) a lead disc atop the spacer, and
      (vi) a second spacer atop the lead disc, and
   (b) a set of laminar shielding sleeves, for only partially shielding a source each comprising a core layer and a layer of lead.

10. The apparatus of claim 9, wherein:
   (a) the lead of the shielding sleeves comprises a wrap of lead foil, and
   (b) the core layer defines a longitudinal notch in its outside surface for accommodating an edge of the foil.

11. The apparatus of claim 9, further comprising: a plastic jacket wrappable about the lead layer of each sleeve and having an edge-to-edge closure structure for adjusting the closed circumference of the jacket to fit the remainder of the sleeve.

* * * * *

Notice of Adverse Decision in Interference

In Interference No. 101,040, involving Patent No. 4,333,010, W. H. Miller, DOSE CALIBRATOR LINEARITY EVALUATION, final judgment adverse to the patentee was rendered Oct. 14, 1983 as to claims 1, 7 and 8.
[*Official Gazette February 7, 1984.*]